Dec. 3, 1929. W. H. MORGAN, SR Re. 17,513
APPARATUS FOR DISINTEGRATING SUGAR CANE
Original Filed June 4, 1925 2 Sheets-Sheet 1
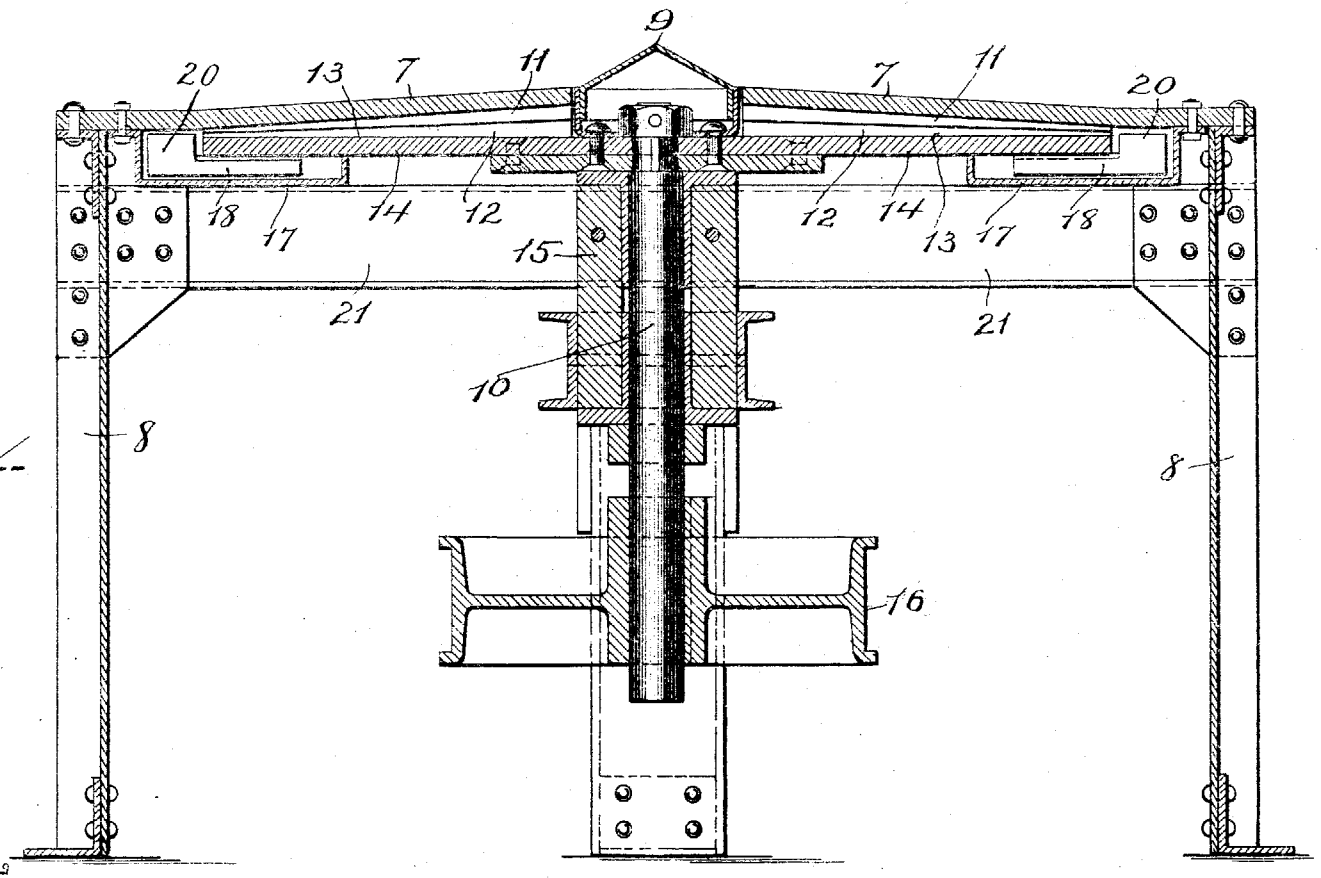
Inventor
W. H. Morgan, Sr
By Seymour & Bright
Attorneys

W. H. MORGAN, SR

Dec. 3, 1929. APPARATUS FOR DISINTEGRATING SUGAR CANE Re. 17,513

Original Filed June 4, 1925 2 Sheets-Sheet 2

Inventor

W. H. Morgan, Sr.

By Seymour & Bright

Attorneys

Reissued Dec. 3, 1929 Re. 17,513

UNITED STATES PATENT OFFICE

WILLIAM H. MORGAN, SR., DECEASED, LATE OF ALLIANCE, OHIO, BY ANNETTE S. MORGAN, EXECUTRIX, OF ALLIANCE, OHIO, ASSIGNOR TO MORGAN HURRYCANE COMPANY, OF NEW YORK, N. Y., A CORPORATION OF FLORIDA

APPARATUS FOR DISINTEGRATING SUGAR CANE

Original No. 1,646,761, dated October 25, 1927, Serial No. 34,878, filed June 4, 1925. Application for reissue filed June 15, 1928. Serial No. 285,649.

This invention relates to an improvement in continuous rotary centrifugal shear adapted particularly for converting sugar cane or other sugar producing material into a fibrous mass which will readily pass through juice extracting rolls, and which is designed to be used in connection with other mechanism for extracting the juice from the cane.

The primary object of the present invention is to improve the construction and mode of operation of devices for disintegrating sugar cane stalks and the like, and to produce an improved and highly efficient machine by which such material may be disintegrated so as to reduce the same to a fibrous mass.

With this and other objects in view the invention consists in the parts and combination of parts as will be more fully described and pointed out in the claims.

Figure 3:
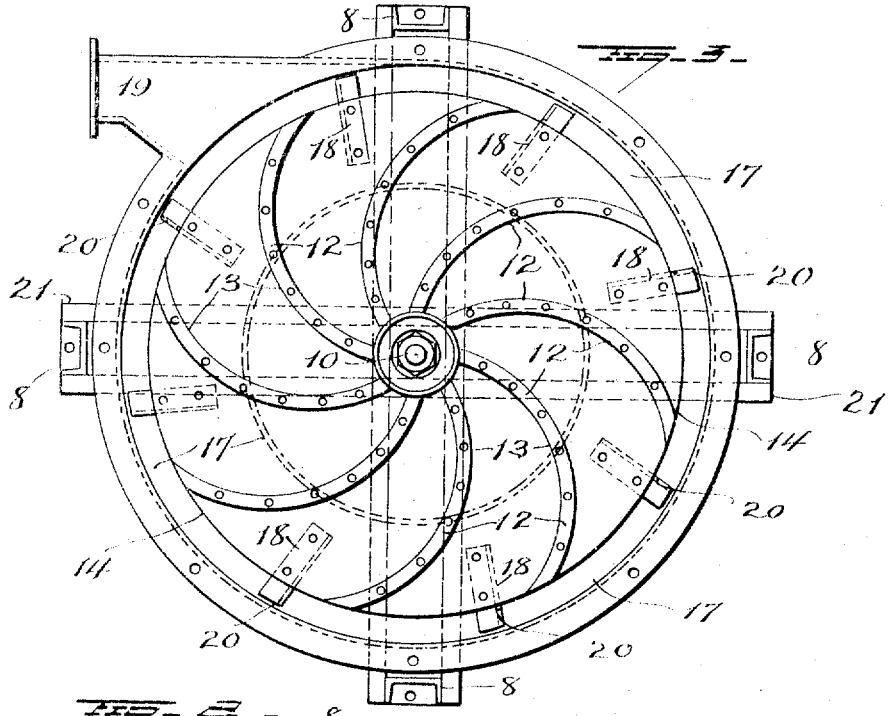
Figure 2:
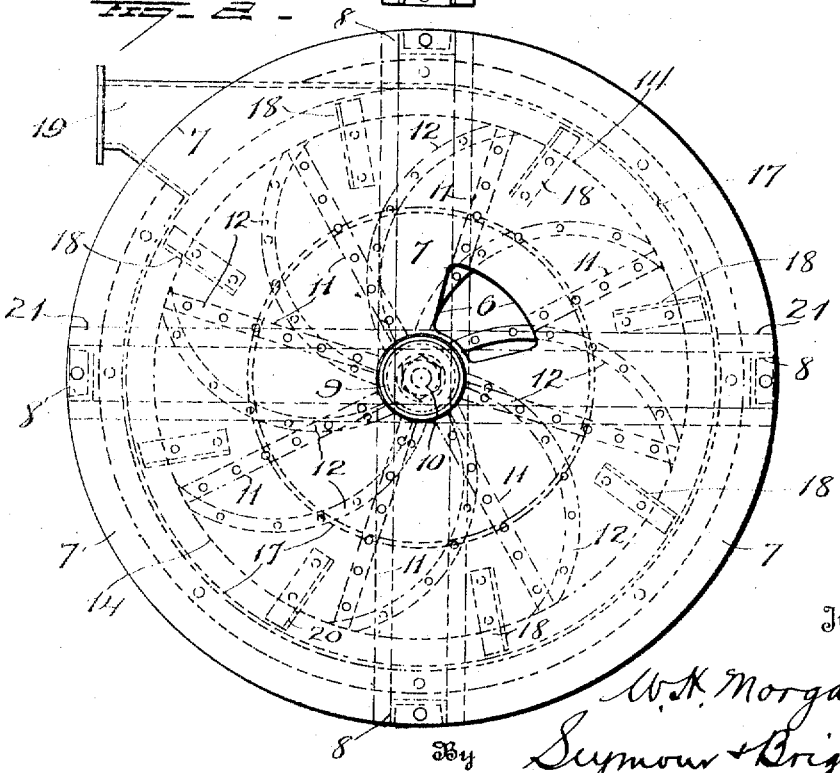

In the accompanying drawings, Figure 1 is a view in vertical cross section of the apparatus; Figure 2 is a view in plan of the same and Figure 3 is a view in plan of the top, the stationary disk being removed.

In using the shredder or disintegrator the cane is cut into short lengths, about six inches more or less and these cut sections are then fed to the disintegrator which is located in the mill.

The cane prepared in the manner above described is fed into an opening or openings 6 in the top member or plate 7 of the rotary shear, which plate is stationary and held in place by the supporting member 8. The feed opening or openings are located near the center of plate 7 which is circular in form and slightly conical. It is provided centrally with an opening closed by cap 9 which covers the upper end of shaft 10. This plate 7 is provided on its under side with a series of straight grooves which radiate from the center of the member, and each groove carries a shear blade or knife 11 which latter is beveled at its side edges and wedge shaped longitudinally the thicker ends of the knives being adjacent the center of plate as shown in Figure 1. The knives may be beveled at one or both side edges, but they may, if desired, be beveled on one side only so as to form cutting edges which co-act with the knives 12 located within grooves 13 formed in the lower plate 14. This lower plate is circular in form, of less diameter than the upper plate and is rigidly secured centrally to the upper end of shaft 10. This lower plate is flat so that when combined with the upper plate a gradually decreasing space is formed between the two plates, the space in the outer edge or periphery being comparatively smaller and constituting the outlet for the sheared or fibrous material. If desired, the lower or revolving plate may also be made slightly conical. The space between the two plates adjacent to the center, is considerably greater than the width of sugar cane stalk so as to permit the latter to be readily fed into this space and the centrifugal force set up by the revolution of the lower plate causes the material as it is sheared to flow outwardly toward the outer edge of lower revolving plate.

The knives 12 in the lower plate may also be beveled and are curved or scimitar shaped longitudinally and fit within similarly shaped recesses formed in the lower plate. The shears 12 of the lower plate are deeper or thicker at their inner ends so that the knives project at their inner ends a greater distance from the lower plate than they do at their outer edges. When the two plates with the knives are assembled the adjacent faces of the knives are parallel and nearly in contact.

Secured to the top or fixed plate or disk 7 is the circular trough shaped shield 17 which latter is secured to the underside of the upper disk 7 as shown in Figure 1, and projects downwardly, inwardly and upwardly and terminates well within the periphery of the lower disk 14, and close to the latter. This trough or shield 17 is as before stated circular in shape, and is so located that the shredded fibrous material which is ejected at the periphery of the rotary disk is caught up by said shield or trough, and is carried around therein by the fan blades 18 which latter are rigidly secured to the underside of the rotary disk or plate 14, and operate by suction or air blast and by direct contact to carry the shredded material around and discharge the same through the spout 19, from which it is carried by a conveyor or otherwise to the juice extracting apparatus.

The fan blades 18 project beyond the periphery of the revolving disk as shown and are enlarged at their outer ends as at 20, so as to project up approximately to or above the revolving disk 14 to engage the shredded material as it is ejected from the periphery of the disk. These blades are approximately as large as the cross sectional area of the trough or shield 17 so as to not only act as fan blades and create a blast or suction, but also to push the shredded material toward the discharge opening and prevent clogging of the spout or shield. This shield or spout is as before stated secured by screw bolts to the upper stationary disk, and also on one or both pairs of cross beams 21 which are secured to the supporting member 8, which as previously explained carry the upper stationary disk or plate 7.

The lower plate 14 as before stated, is secured to the upper end of shaft 10, which latter is mounted in the vertical bearings 15 and is provided with the pulley 16 by which it is rotated.

In the operation of the apparatus the material which may be cane or other stalks, or other material, to be disintegrated, is fed into the machine by gravity through a hopper or hoppers located above the opening 6 or openings in the upper plate 7. As the lower plate is rapidly revolved by a belt or a pulley 16, or by any suitable gearing, or by a direct connection with a vertical motor, the material will be thrown by centrifugal force outwardly between the shears on the upper and lower plates and coming in contact with said shears will be disintegrated into a fibrous mass, and thus put it in a condition to be readily passed between juice extracting rollers without any further crushing. The lower knives being scimitar shaped also have a tendency to aid the progress of the material from the center of the plates out towards the discharge openings between the plates. The knives are held to their respective upper and lower plates by means of bolts the heads of which are located in countersunk holes in the knives or cutters.

The shredded fibrous sections after they are ejected from between the two disintegrating disks is thrown into the trough or shield 17 and is carried by the fan blades 18 around to the discharge spout 19, which preferably discharges onto a conveyor which carries the fibrous sections up or to the juice extracting apparatus which latter may be of any approved type.

While the drawings show the upper disk stationary and the lower disk revolving, I do not wish to limit myself to this arrangement but that the upper disk might also be revolving in a direction opposite to the direction of rotation of lower disk. The product of the machine is a result of the relative rotation of the two disks, and this relative rotation can be obtained by either having one of the disks stationary and revolving the other, or as stated above, by revolving both of the disks but in opposite directions.

It is evident that many slight changes might be resorted to in the relative arrangement of parts shown and described without departing from the spirit and scope of the invention, hence would have it understood that it is not desired to be confined to the exact construction and arrangement of parts shown and described but, Having fully described the invention what is claimed as new and desired to be secured by Letters Patent, is:—

1. In an apparatus for converting sugar cane and other sugar producing material into a fibrous mass, consisting of a member having cutting or shearing members on its inner face, a second member having cutting or shearing members on its inner face, the cutting or shearing member on the two shearing units of the apparatus coacting to shred or shear the sugar producing material longitudinally into a fibrous mass in contradistinction to grinding it into granular particles and one of said members being mounted to rotate, a shield embracing the periphery of the rotating member, a discharge spout connected with said shield and means actuated by the rotating member for forcing the material discharged into the shield through the discharge spout.

2. In an apparatus for converting sugar cane and like material into a fibrous mass, consisting in a member having shear blades on its inner face, a second member having shear blades on its inner face, one of said members adapted to be rapidly revolved and one of them being conical shaped so that the space between them will be greater at the center than at the periphery so as to permit the cane stalks to be fed lengthwise or at right angles to the shaft carrying the movable member whereby the stalks will be cut or shredded into fibrous hay-like sections in contradistinction to grinding them into granular particles, the opposing faces on the two sets of shears approximately contacting throughout their lengths, a shield surrounding the periphery of the rotating member and provided with a discharge spout and means carried by the rotating member and located within the shield for forcing the shredded material toward and out of the exit spout.

3. In an apparatus for converting sugar cane and like material into a fibrous mass consisting in a member having shear blades on its inner face, a second member having shear blades on its inner face, and means for rotating one of said members, and one of the latter being conical so that the space between them is greater at the center than at the periphery so as to permit the cane stalks to be fed lengthwise or at right angles to the shaft carrying the movable member whereby the stalks will be carried around and shredded into fibrous hay-like sections in contradistinction to grinding them into granular particles, and the adjacent faces of the shear blades being approximately in contact, a trough shaped shield embracing the periphery of the rotating disintegrating member provided with a discharge spout and means on the rotary member for projecting the sheared mass in the shield to the discharge spout of the latter.

4. In an apparatus for converting sugar cane and like material into a fibrous mass, consisting in a member having shear blades on its inner face, a second member having shear blades on its upper face, the blades of one of said members being scimitar shaped to assist centrifugal force in carrying the fibrous mass to the discharge opening at the periphery of said members, means for rotating one of said members, a trough shaped shield embracing the periphery of the rotating member and means on the rotating member for assisting in the removal of the material from between the two shredding members and for forcing the fibrous material to the discharge spout of the shield.

5. In an apparatus for converting sugar cane and like material into a fibrous mass in contradistinction to grinding into granular particles for the subsequent extraction of the juice therefrom, consisting of a conical fixed member having shear blades on its inner face, a flat member having shear blades on its inner face, means for rotating the last mentioned member, a trough shaped shield embracing the rotating member, and provided with a discharge spout and means carried by said rotating member for forcing the shredded material deposited in the trough to the discharge exit in the latter.

6. In an apparatus for converting sugar cane and like material into a fibrous mass for the subsequent extraction of the juice therefrom, consisting of a fixed member having shear blades on its inner face, a second member having shear blades on its inner face, means for rotating the second member whereby the stalks will be carried outwardly lengthwise and around between the said faces of said numbers and finally ejected between the peripheries thereof, a trough shaped shield embracing the periphery of the rotating member and provided with a discharge spout and fan blades secured to said rotating member and moving within the shield.

7. In an apparatus for converting sugar cane and like material into a fibrous mass for the subsequent extraction of the juice therefrom, consisting of a fixed member having shear blades on its inner face, a co-acting member having shear blades on its inner face, means for rotating the second member whereby the stalks fed into the space between the two shearing members will be carried around and outwardly until it is thoroughly shredded in contradistinction to grinding it into granular particles, a trough shaped shield rigidly secured in place around the periphery of the rotating member, overlapping the latter and provided with a discharge spout and means carried by the rotating member and moving in the trough for forcing the shredded material to the discharge opening in the latter.

8. In an apparatus for converting sugar cane and like material in a fibrous mass for the subsequent extraction of the juice therefrom, consisting of a fixed member having shear blades on its inner face, a coacting member having shear blades on its inner face, means for rotating the second member whereby the cane stalks will be carried around with their longitudinal axes at right angles to the axis of the rotating member whereby the stalks will be shredded into a fibrous hay-like mass in contradistinction to grinding them into granular particles, a trough shaped shield secured to the fixed member and embracing and overlapping the periphery of the rotating member, and blades on the rotating member and moving in the shield, the said blades being of approximately the shape of the cross section of the trough or shield.

9. In an apparatus for converting sugar cane and like material into a fibrous mass in contradistinction to a granular mass, consisting in an upper member having shear blades on its lower face, a lower member having shear blades on its upper face, one of said members adapted to be rapidly revolved and one of them being conical shaped so that the space between them will be greater at the center than at the periphery to permit the cane stalks to be fed into the shearing space with their longitudinal axes approximately at right angles to the axis of the revolving shear member, the opposing faces on the two sets of shears being approximately horizontal and nearly contacting throughout their lengths.

10. In an apparatus for converting sugar cane and like material into a fibrous mass in contradistinction to a granular mass consisting in an upper member having shear blades on its lower face, a lower member having shear blades on its upper face, and means for rotating one of said members, and one of the latter being conical so that the space between them is greater at the center than at the periphery to permit the cane stalks to be fed into the space between the shearing surfaces, approximately at right angles to the axis of the rotating member, and the adjacent faces of the shear blades being horizontal and approximately in contact.

11. An apparatus for reducing sugar cane and the like to a fibrous mass, having in combination a member having an inner cane confining face, shear blades extending from the inner face of said member, a rotary member having a cane confining face arranged in opposed relation to said face of said first member and spaced therefrom, and shear blades projecting from said face of said rotary member and co-operating with said first mentioned blades to shred or shear the cane longitudinally into a fibrous mass.

12. An apparatus for reducing sugar cane and the like to a fibrous mass, having in combination a stationary member having an inner cane confining face, shear blades extending from the inner face of said member, a rotary member having a cane confining face arranged in opposed relation to said face of said first member and spaced therefrom, and shear blades projecting from said face of said rotary member and co-operating with said first mentioned blades to shred or shear the cane longitudinally into a fibrous mass.

13. An apparatus for reducing sugar cane and the like to a fibrous mass, having in combination a member having an inner cane confining face, shear blades projecting from the inner face of said member, a rotary member having a cane confining face opposed to the inner face of said first member and spaced therefrom, said members being formed so that the space between the same is greater adjacent the axis of the rotary member than adjacent the periphery thereof, shear blades projecting from said face of the latter member to co-act with the blades on said first member to shred or shear the cane longitudinally into a fibrous mass, and means by which the cane may be introduced adjacent the axis of the rotary member, the cane passing outwardly from said axis between said members.

14. An apparatus for reducing sugar cane and the like to a fibrous mass, having in combination a member having an inner cane confining face, shear blades extending from the inner face of said member, a rotary member having a cane confining face arranged in opposed relation to said face of said first member and spaced therefrom, shear blades projecting from said face of the latter member and co-operating with said first-mentioned blades, to shred or shear the cane longitudinally into a fibrous mass, means forming a peripheral passage into which the material is discharged from between said members, and means for projecting the material through said passage longitudinally thereof.

15. An apparatus for reducing sugar cane and the like to a fibrous mass, having in combination a member having an inner cane confining face, shear blades extending from the inner face of said member, a rotary member having a cane confining face arranged in opposed relation to said face of said first member and spaced therefrom, shear blades projecting from said face of the latter member and co-operating with said first-mentioned blades to shred or shear the cane longitudinally into a fibrous mass, means forming a circumferential passage into which the material is discharged from between said members, fan blades carried by the rotary member and rotating within said passage for projecting the material therethrough, and a discharge outlet for said passage.

16. An apparatus for reducing sugar cane and the like to a fibrous mass, having in combination a member having an inner cane confining face, a series of shear blades projecting from the inner face of said member, a rotary member having a cane confining face in opposed relation to said face of said first member and spaced therefrom, scimitar shaped blades projecting from the cane confining face of one of said rotary members and co-acting with the blades on said other member to shred or shear the cane longitudinally into a fibrous mass, and means by which the rotary member may be rotated in a direction to cause the blades to assist in throwing the material outwardly away from the axis of the same.

17. An apparatus for reducing sugar cane and the like to a fibrous mass, having in combination a member having an inner cane confining face, a series of shear blades projecting from the inner face of said member, a rotary member having a cane confining face opposed to the inner face of said first member and spaced therefrom, one of said faces being conical in form so that the space between said faces diminishes in width from the axis of the rotary member toward the periphery thereof, and shear blades projecting from the said face of the latter member and co-acting with the blades on said first member to shred or shear the cane longitudinally into a fibrous mass.

18. An apparatus for reducing sugar cane and the like to a fibrous mass, having in combination a stationary plate, shear blades projecting from the inner face of said plate, a rotary member having a face arranged in opposed relation to the inner face of said plate and spaced therefrom, shear blades projecting from the said face of said rotary member and co-acting with the blades projecting from said plate to shred or shear the cane, fed between said members adjacent the axis of said rotary member, longitudinally into a fibrous mass, means forming a passage for the collecting of the material discharged from between said members and adjacent the peripheries thereof, and fan blades mounted on said rotary member and operating in said passage to create air currents to assist in carrying the material radially between the said members and cause the same to be discharged into said passage, said fan blades also operating to project the material through said passage.

19. In an apparatus for reducing sugar cane and the like to a fibrous mass, a member having shear blades upon one face thereof, a co-operating member having shear blades projecting from a face thereof located in opposed relation to and spaced from said face of said first member, the blades of one of said members being scimitar shaped to assist centrifugal force in carrying the fibrous mass to a discharge opening for said members, and means by which one of said members may be rotated.

20. A machine for disintegrating sugar cane stalks comprising, in combination, cane-confining walls separated by a relatively narrow space through which the cane stalks are passed, and means for splitting the cane stalks in general directions longitudinally of the stalks while confined in the narrow space between said walls to reduce the same to a fibrous mass.

21. A machine for disintegrating sugar cane stalks comprising, in combination, cane-confining walls separated by a relatively narrow space converging in the direction of movement of the cane stalks, through which space the stalks are passed, and means for splitting the cane stalks in general directions longitudinally of the stalks while confined in the narrow space between said walls to reduce the same to a fibrous mass.

22. A machine for disintegrating sugar cane stalks comprising, in combination, cane-confining walls separated by a relatively narrow space through which the cane stalks are passed, and means for cutting the cane stalks in general directions longitudinally of the stalks progressively into finer and finer particles during their passage through the narrow space between said walls to reduce the same to a fibrous mass.

23. A machine for disintegrating sugar cane stalks comprising, in combination, cane-confining walls separated by a relatively narrow space, and devices for forcing the stalks through the space between said walls and for splitting the same repeatedly in general directions longitudinally of the stalks while passing between said walls to reduce the same to a loose fibrous mass.

24. A machine for disintegrating sugar cane stalks comprising, in combination, walls for confining the cane stalks separated by a relatively narrow space and extending outwardly from a central axis, and means for whirling the cane stalks about said axis between said walls and for splitting the same repeatedly in the general directions of the axes of the stalks to reduce the stalks to a loose fibrous mass.

25. A machine for disintegrating sugar cane stalks comprising, in combination, walls for confining the cane stalks separated by a relatively narrow space extending outwardly from a central axis and converging from said axis outwardly, and means for whirling the stalks about said axis between said walls and for splitting the same repeatedly in the general directions of the axes of the stalks to reduce the stalks to a loose fibrous mass.

26. A machine for disintegrating sugar cane stalks comprising, in combination, walls separated by a relatively narrow space for confining cane stalks introduced therebetween, and means for splitting the cane stalks repeatedly in general directions longitudinally thereof and for subjecting the stalks to violent impacts while passing between said walls to reduce the same to a loose fibrous mass.

Signed at Alliance, in the county of Stark and State of Ohio, this 4th day of June, 1928.

ANNETTE S. MORGAN,
*Executrix of the Estate of William H. Morgan, Deceased.*